Jan. 8, 1957  H. B. SAUNDERS  2,776,777
PASTEURIZER
Filed Aug. 19, 1952  4 Sheets-Sheet 1
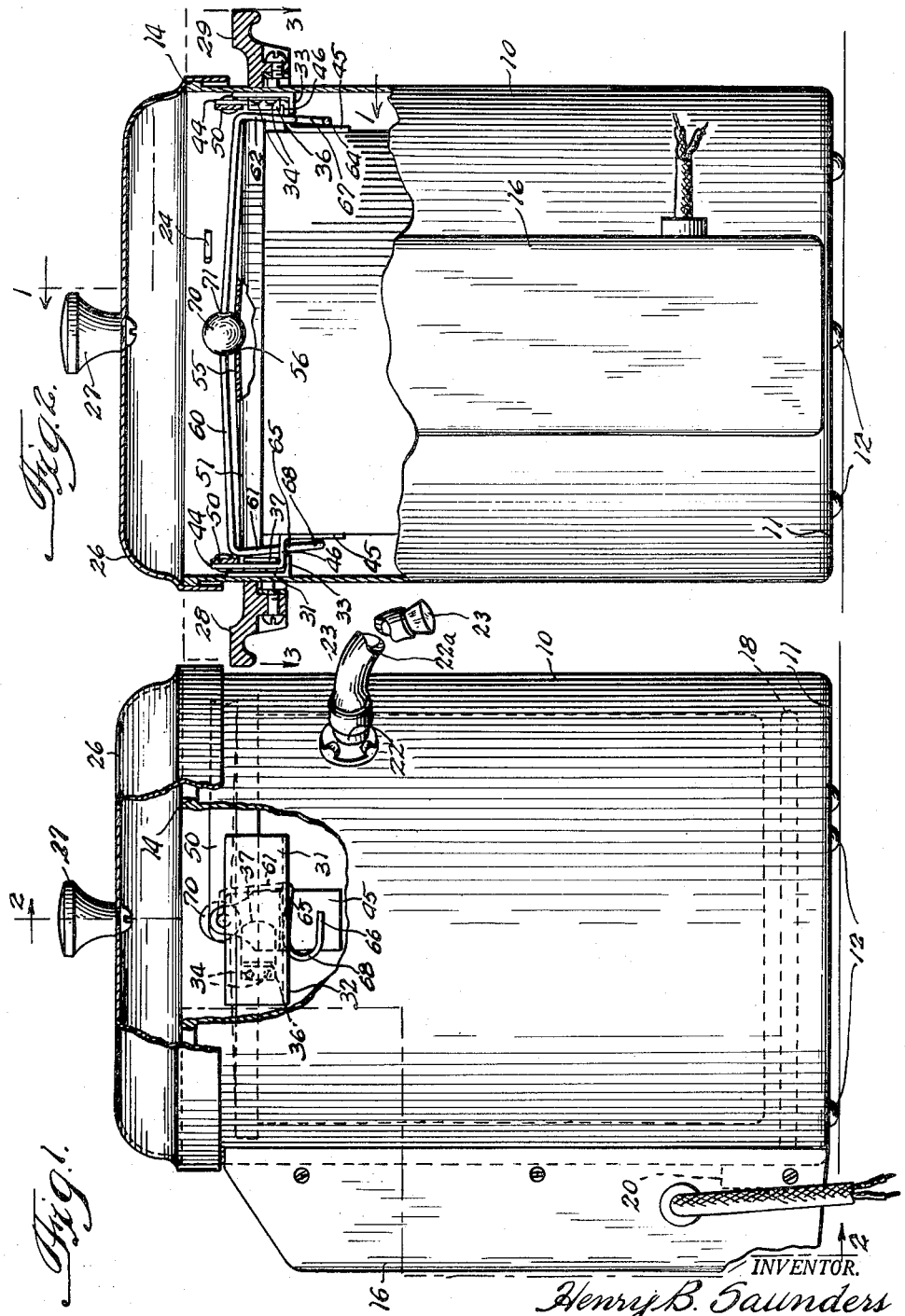
INVENTOR.
Henry B. Saunders
BY
Robert L. Kahn Jan. 8, 1957          H. B. SAUNDERS          2,776,777
                        PASTEURIZER
Filed Aug. 19, 1952                        4 Sheets-Sheet 2
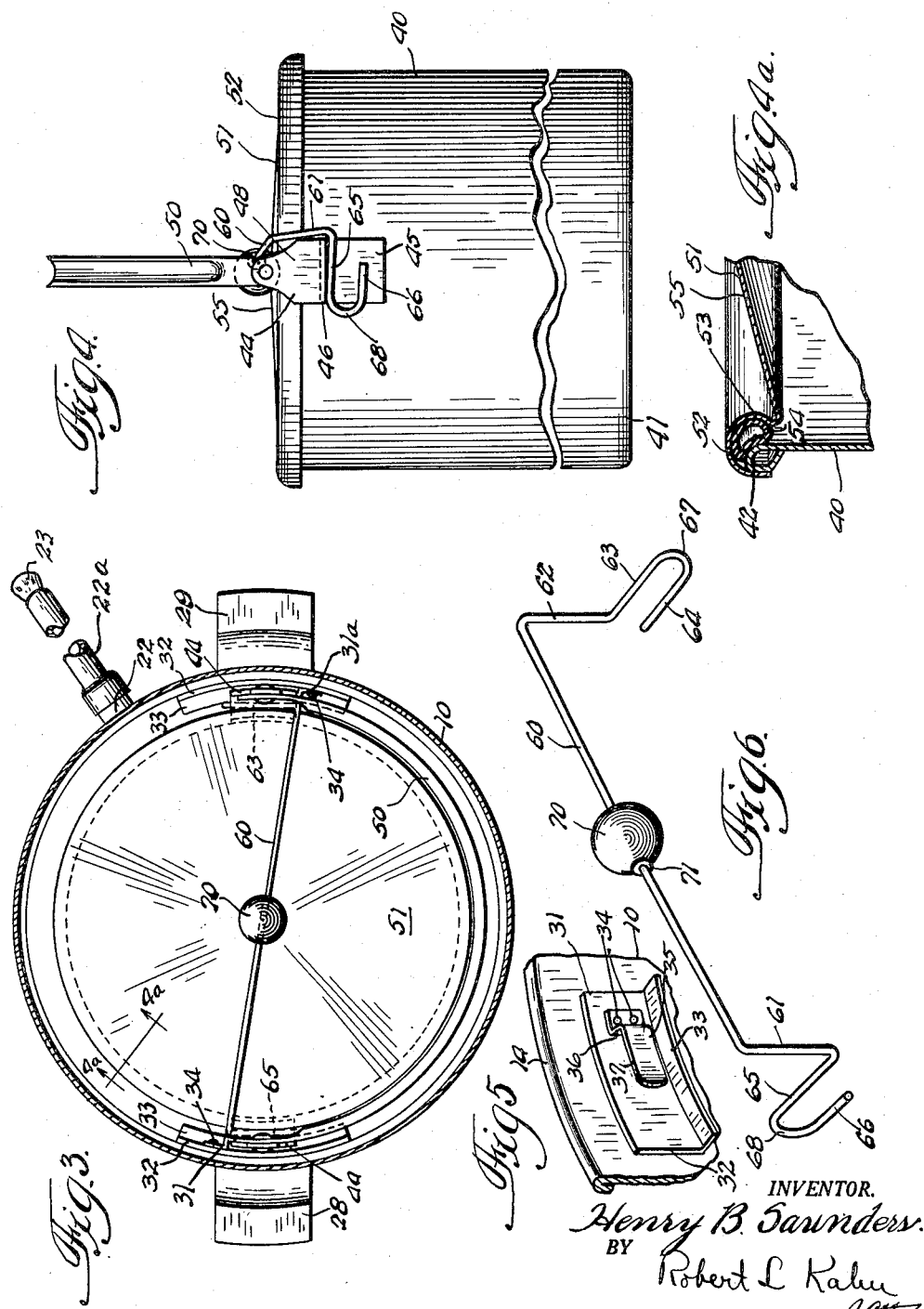
INVENTOR.
Henry B. Saunders
BY
Robert L. Kahn

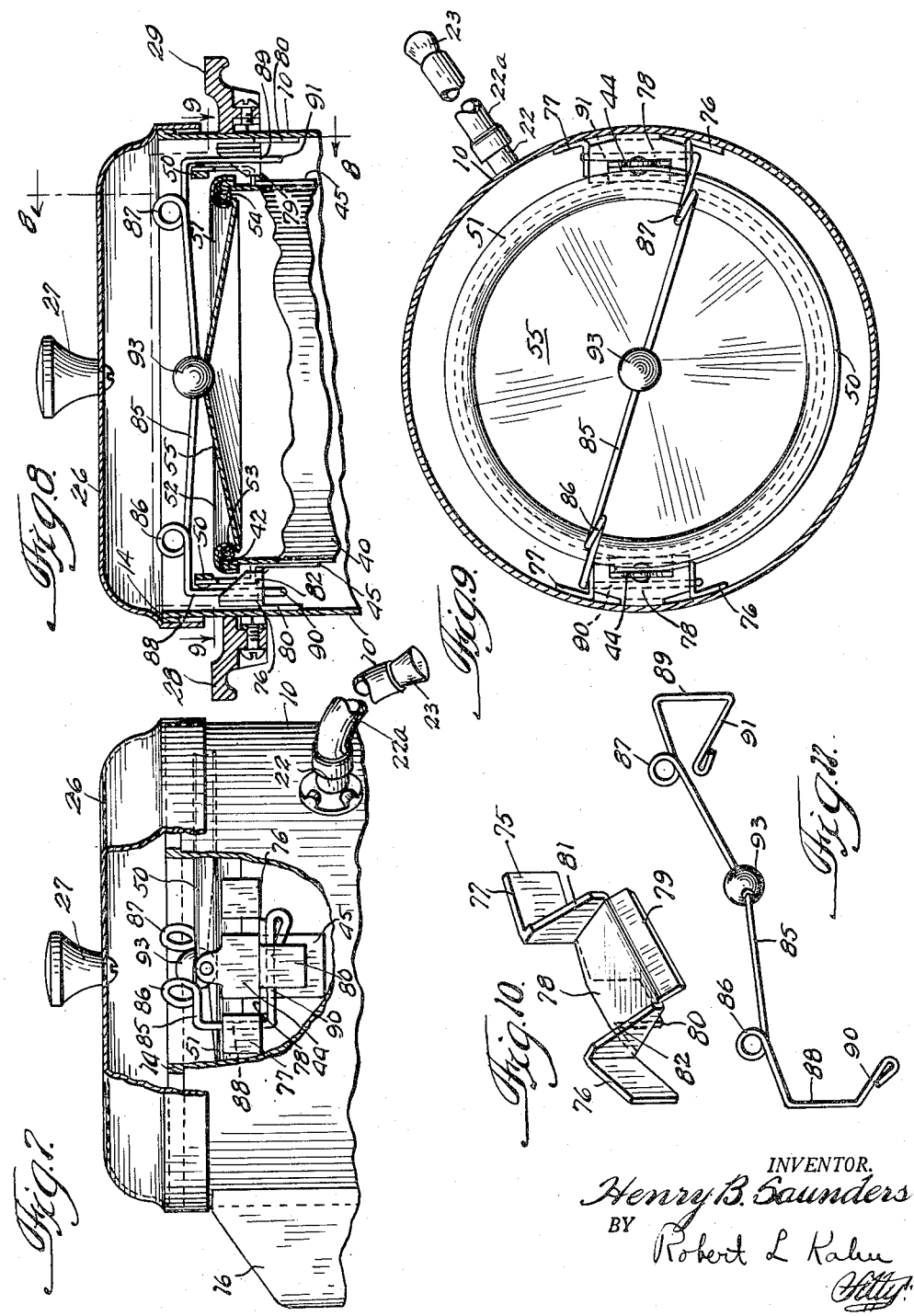

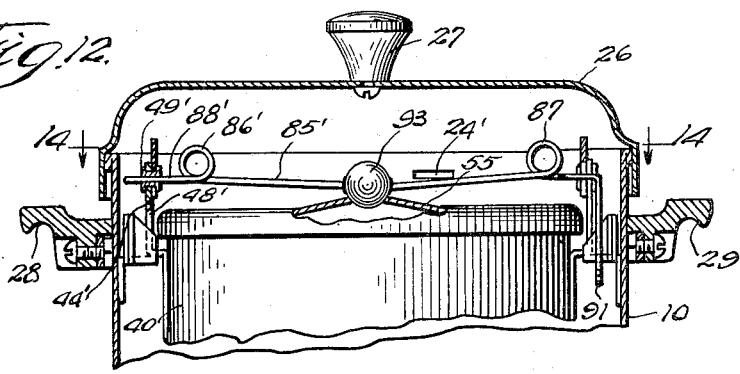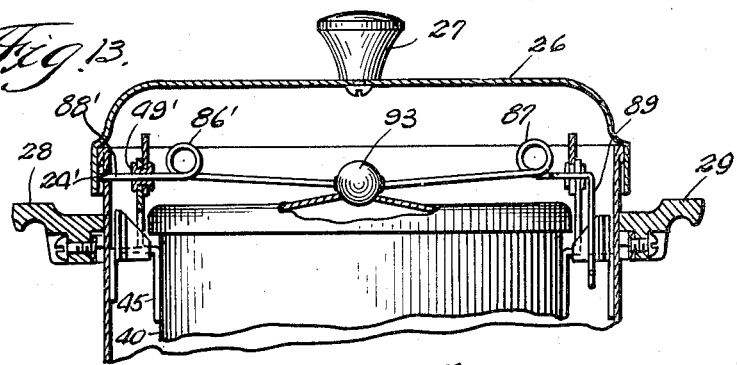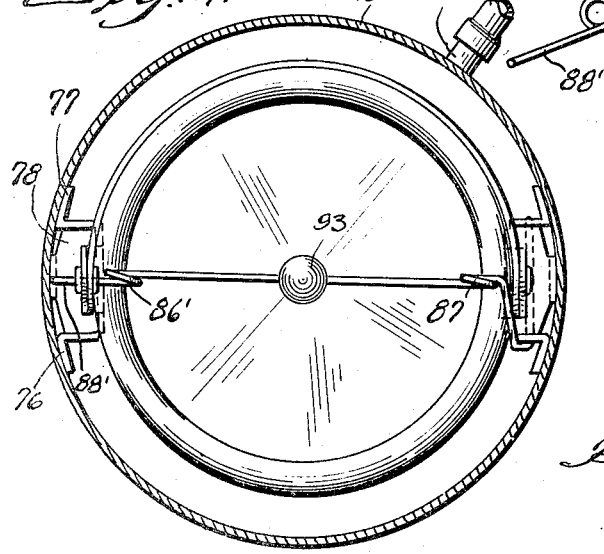

United States Patent Office 2,776,777
Patented Jan. 8, 1957

2,776,777

PASTEURIZER

Henry B. Saunders, Warrenville, Ill., assignor, by mesne assignments, to The Schlueter Co., Janesville, Wis., a corporation of Wisconsin Application August 19, 1952, Serial No. 305,114

3 Claims. (Cl. 220—13)

This invention relates to a pasteurizer for processing small quantities of milk or other material. While the invention may be embodied in larger sizes, a small size embodiment is particularly useful for homes where pasteurized milk is not available and where milk in quantities of a gallon or less is to be pasteurized.

Pasteurizers for home use involve different problems than commercial pasteurizers. Pasteurizers for handling large quantities of milk are elaborate and have various types of safety features to insure proper sterilization and pasteurization. In contrast to this, a pasteurizer for home use must be mechanically simple, since frequently a woman or a child may be called upon to operate the same. Furthermore, such a pasteurizer must be easily cleaned and sterilized in the same manner as household dishes in a sink or other convenient household appliance. Also, such a pasteurizer must meet the rigid sanitary requirements of the various health bodies of both federal and state governments.

As a rule, health regulations involve the requirement that every part which can be contacted by milk must itself be at pasteurizing temperature in a wet atmosphere. Many devices may pasteurize milk in a satisfactory manner, but permit contamination during chilling or during removal of the milk container from the pasteurizer proper.

The pasteurizer of this invention is mechanically simple so that a minimum of tooling and assembly is required for the manufacture thereof. Furthermore, the new pasteurizer utilizes materials which may be easily sterilized and the construction is such that it may be handled and even abused without damage.

As is well known, pasteurization of milk, or other material involves the heating thereof to a predetermined temperature for a predetermined time. The pasteurizing treatment curve for milk, as an example, has an infinite number of temperature points, length of time of treatment decreasing with rise in temperature of the treatment.

Thus, as an example, a common treatment point involves the heating of milk up to 143° F. and maintaining this temperature for ½ hour. Another common treatment point is raising the temperature to 161° F. and holding it for 15 seconds. After pasteurization is complete, it is desirable to cool the milk as quickly as possible to preserve the visible cream content and flavor.

The above pasteurizing temperatures and times are based upon milk being open to atmospheric pressure. Under higher pressures, the pasteurizing temperature or time may be reduced. This has a favorable reaction on the visible cream content. The new pasteurizer treats the milk under a greater than atmospheric pressure. This has a number of desirable effects. The higher internal pressure prevents any ingress of bath water into the milk. The new pasteurizer provides a water bath and means whereby the water bath level in the pasteurizer during cooling is reduced below the pasteurizing level so that upon cooling of the milk and the subsequent reduction of pressure on the milk at atmospheric pressure, or even below atmospheric pressure, there will be no leakage of water into the milk.

An important feature of the new pasteurizer relates to the gasket for sealing the milk pail and cover. The new construction provides a tight seal and permits easy cleaning of the gasket and gasket seat.

The new pasteurizer also provides a near oxygen-free atmosphere for the milk during both heating and cooling parts of the pasteurizing cycle. This saves more of the easily oxidized vitamin C content and also prevents the oxidation of other compounds, which oxidized compounds hurt the milk flavor. In the new pasteurizer, the initial heating of the milk expels air above the milk surface from the milk container, and causes the space above the milk to be filled with water vapor from the water content of the milk. During cooling, the introduction of air above the milk surface is impeded.

The new construction is such that every part with which the milk may or does contact is maintained under hot water during the entire time of pasteurization. The milk pail cover is so shaped that hot water will remain at the cover margin under all conditions thus insuring thorough pasteurization at the meeting of the cover and pail edges. The gasket construction is such that sealing action is improved both during pasteurization and cooling.

The new gasket contains a sealed body of air therein which expands under heat and effectively increases the sealing action of the gasket during this part of the pasteurizing cycle. Upon cooling, the reduction in pressure within the milk pail results in the cover being forced tightly against the gasket to compress the same.

The new pasteurizer comprises an inner milk pail of simple, cylindrical shape nested in an outer water pail. The milk pail has a simple crowned cover cooperating with a gasket to seal the milk pail. The cover is apertured, preferably at the center in the specific forms disclosed, a spring wire member carrying a flexible sealing member is provided which functions to lock the cover to the milk pail and also to maintain the seal over the cover aperture. Thus a seal is provided which holds pressure above atmospheric and holds a vacuum below atmospheric pressure.

The sealing member may be conveniently removed or displaced without necessarily unlocking the milk pail cover, permitting of the insertion of a thermometer to take the milk temperature, if this should be found desirable. The cooling is accomplished without exposing the milk to any possibility of leakage of bath or cooling water into the milk pail. Then the sealing member is removed from the aperture at the milk pail cover to relieve the vacuum produced during cooling and permit the cover to be removed.

Several forms of pasteurizers illustrative of the present invention are disclosed. In one form, the lock for the milk pail cover does not lock the milk pail inside of the water pail while in another form the lock for the milk pail cover will lock the milk pail in the water pail.

In order that the invention may be understood, reference will now be made to the drawings wherein certain exemplary embodiments of the invention are shown, it being understood that variations in construction are possible without departing from the spirit of the invention.

In the drawings:

Figure 1 is an elevation from the side of one form of a pasteurizer embodying the present invention, a part of the cover and containers being shown broken along line 1—1 of Figure 2 to show the construction of the locking means for maintaining the milk pail within the water pail;

Figure 2 is an elevation similar to Figure 1 but taken from the front of the pasteurizer, part of the top being broken away along line 2—2 of Figure 1;

Figure 3 is a sectional view on line 3—3 of Figure 2;

Figure 4 is a side elevation of the milk pail of the pasteurizer shown in Figures 1 and 2, the milk pail being shown removed from the water pail and the cover for the milk pail being locked in position;

Figure 4a is an enlarged detail in section showing the gasket arrangement at the milk pail cover;

Figure 5 is a perspective detail of the bracket carried by the water pail at the inside for supporting and locking the milk pail;

Figure 6 is a perspective of one form of spring lock and seal for the milk pail cover;

Figure 7 is an elevation of the top portion of a modified pasteurizer embodying the present invention, certain parts being broken away on line 7—7 of Figure 8 to illustrate a modified locking means;

Figure 8 is a sectional view similar to Figure 7 but showing the details of the locking means for maintaining the milk pail inside of the water pail;

Figure 9 is a section along line 9—9 of Figure 8;

Figure 10 is a perspective detail of the bracket for supporting and locking the milk pail;

Figure 11 is a perspective detail of the spring cover lock and milk pail seal for the modified construction shown in Figures 7 and 8.

Figure 12 is a sectional elevation of the top portion of a pasteurizer illustrating a still further modified locking means for the milk pail;

Figure 13 is a sectional elevation of the top portion of a pasteurizer illustrating a further modified locking means for the milk pail;

Figure 14 is a top sectional view along line 14—14 of Figure 12;

Figure 15 is a perspective of the locking member for the forms of pasteurizer illustrated in Figures 12 and 13.

Referring first to Figures 1 to 6 inclusive, the pasteurizer includes outer pail 10 for holding water. Pail 10 has bottom 11 provided with a number of bumped out portions 12 to elevate the bottom for support and to permit the pasteurizer to slide easily along a surface. Pail 10 is preferably circular and is provided with beaded edge 14 defining the open top of the pail.

Pail 10 carries control panel 16 suitably attached to the outside of the pail and extending vertically of the pail, as shown in Figures 1 and 2. Control panel 16 carries inside thereof suitable mechanism and connections for electric power so that the pasteurizer may operate. Control panel 16 has electric heating element 18 passing through the wall of the pail near the bottom thereof. It is understood that heating element 18, when it passes through the wall of the pail, is sealed so that the joints are water-tight. Control panel 16 also has a thermostat assembly, generally indicated by numeral 20, this thermostat assembly being suitably and intimately attached to the pail wall so that the temperature of the water within the pail will control the thermostat. It may be desirable to indent the pail wall inwardly at the region of the thermostat so that intimate contact of the thermostat with the water in the pail will be assured.

At a predetermined height above the bottom of the pail there is disposed water outlet 22. This water outlet consists of a short pipe or tube attached to the pail, the pail wall being apertured at this region so that water within the pail may flow out through pipe 22. This pipe determines the level of cold water during cooling and for convenience will hereinafter be referred to as the cold water outlet. Hose 22a is drawn over pipe 22 and has stopper 23 for the hose end. During normal use of the pasteurizer, stopper 23 is pushed into the hose end to prevent water from flowing out. It will be noted that the cold water level is some distance below beaded edge 14 of the pail.

Disposed somewhat below the mouth of water pail 10, above cold water outlet 22, is safety hot water outlet 24 (Fig. 2), this consisting of a slot in the pail wall, the slot having its length horizontally of the pail. During pasteurization, outlet 24 will permit excess hot water to escape and thus determine the normal hot water level.

Water pail 10 is provided with cover 26 having knob or handle 27. Cover 26 may have any desired shape and its rim engages beaded edge 14 of the water pail. Thus when the cover is closed during pasteurization, hot water will leak through outlet 24 and prevent the water level from becoming excessively high. Handles 28 and 29 of any desired shape are bolted or attached to the water pail near the top thereof at opposite sides of the pail.

Disposed on the inside of the water pail near the top thereof and on opposite sides from each other are two brackets for supporting a milk pail. These two brackets are identical and one of them is shown in perspective in Figure 5. The brackets may be located in any desired positions within the pail but may be conveniently disposed on the inside of the pail opposite to the corresponding handle for carrying the pasteurizer. Thus referring to Figure 5, the bracket, generally indicated by numeral 31, consists of vertical wall plate 32 having inwardly extending flange 33. Wall plate 32 has riveted thereto, as at 34, spring clip 35 having a general Z-shape with stop shoulder 36 and clip body portion 37. Body portion 37 of the clip extends parallel to plate 32 but is shorter than plate 32 and is spaced inwardly therefrom. The pail has two brackets 31 and 31a with body portions 37 of the clips extending in the same circular direction, either clockwise or counter-clockwise.

Nesting within water pail 10 is milk pail, generally indicated by numeral 40. Milk pail 40 has flat bottom 41 and beaded edge 42, the beading in the milk pail preferably, though not necessarily, extending outwardly from the pail side, this forming a shoulder or flange along the outside of the pail. Both the water and milk pails are circular in cross section, though other shapes may be used. On opposite sides of the milk pail, near edge 42, are attached generally Z-shaped support arms 44. Each arm 44 has mounting part 45 disposed snugly against the outer surface of pail 40, part 45 being riveted, spot welded or otherwise permanently attached to the pail. Arm 44 has outwardly extending shoulder 46, this extending away from the milk pail toward the opposed wall of the water pail when the milk pail is within the water pail. Arm 44 also has pail handle supporting part 48 to which is pivotally secured handle 50 extending between the opposed supporting arms 44 of the milk pail. Handle 50 may be raised above the milk pail, as shown in Figure 4, or may be turned to the side against the milk pail cover as shown in Figure 1.

Cooperating with milk pail 40 is milk pail cover 51, having marginal portion 52 shaped to form a concave annular groove 53 within which there is disposed tubular gasket 54 of flexible material. Annular groove 53 is somewhat wider than the outside diameter of gasket 54 to permit the gasket to flatten. Cover 51 has central portion 55 crowned or bulged upwardly away from the bottom of the milk pail and at the center thereof has aperture 56. The crowned center is the highest part of the cover during normal use.

Gasket 54 is a hollow flexible tube whose ends are sealed together to form an endless flexible pipe with a quantity of air sealed therein. The tube flexibility and compressibility of the air in the gasket combine to provide sealing at all times.

The dimensions of milk pail 40 and supporting arms 44 are such that in the nested position of the pail within water pail 10, bottom 41 of the milk pail will be supported at a slight distance above electric heater element 18. The milk pail is supported by having shoulders 46 of supporting arms 44 rest upon flanges 33 of brackets 31. When the milk pail is in position, handle-supporting parts 48 of milk pail arms 44 are adapted to slide along body part 32 of brackets 31 and extend between body part 32 and clip 37, stop shoulder 36 of the bracket engaging a side edge of the milk pail arm to stop the milk pail from being turned too far.

Means are provided for locking cover 51 upon milk pail 40 and also for sealing aperture 56 of the cover. Such means comprise spring wire arm 60 having downwardly extending parts 61 and 62 and parts 63 and 64 on the one hand and 65 and 66 on the other hand bent to form a sort of U or hairpin shape, the two hairpin parts having bights 67 and 68 respectively. Preferably one of the hairpin parts 65 and 66, for example, is shorter than the other hairpin parts 63 and 64.

As may be seen in Figure 4, downwardly extending parts 61 and 62 of the spring lock are long enough to extend from above the top of cover 51, when it is on the milk pail, so that one hairpin part, as for example, 63, may be slipped under shoulder 46 of milk pail arm 44. On the other end of the spring locking means, the corresponding hairpin portion 65 may be sprung under the corresponding shoulder of the milk pail arm.

Referring to Figure 2, it will be observed that shoulders 46 of the milk pail supporting arms 44 extend outwardly for a sufficient distance so that parts 63 and 65 of the spring lock may extend underneath the shoulders close to the milk pail itself while shoulders 46 can engage and be supported by flanges 33 of the water pail brackets. Spring member 60 carries rubber or other flexible ball 70 thereon, the ball being provided with metal eyelet 71 through which spring wire 60 passes. Ball 70 is slidable along wire 60 and may normally be disposed so that ball 70 is pressed tightly against aperture 56 in cover 51 to seal the same. The pressure in the milk pail on cooling will be below atmosperic pressure and would render the removal of the cover difficult. Wire 60 may be sprung upwardly to permit ball 70 to be moved away from sealing position, even though the spring is locking the cover on the milk pail. This will generally be done after the milk has been cooled and when it is desired to remove the cover.

The sealing member for the milk pail cover is carried by wire 60 for convenience. This member may be separate from the wire and be shaped or grooved so that wire 60 can bear down upon it. Other than spherical shapes for ball 70 may be used.

In the form of the invention so far described, spring lock 60 may be applied to the milk pail when the milk pail is inside or outside of the water pail. In fact, the locking of the milk pail in the water pail to prevent upward movement of the milk pail is independent of the milk pail cover lock.

The overall height of the milk pail and cover, together with sealing ball 70 is such that the hot water level, determined by outlet 24 in the water pail, is well above cover 51 of the milk pail and covers most or all of ball 70 as desired. To lock the milk pail cover in position, it is simply necessary to press hairpin parts 65 and 63 under the corresponding shoulders of the milk pail arms and then turn the spring lock clockwise in this particular instance. Similarly, the milk pail may be dropped into the water pail with supporting arms 44 located above supporting flanges 33 of the brackets, but clear of clips 37. When shoulders 46 of the milk pail rest upon flanges 33 of the water pail, the milk pail may be turned also clockwise in this particular instance and lock the same in position.

Referring now to Figures 7 to 11 inclusive, a modification is shown wherein the brackets carried by the water pail for supporting the milk pail are different and wherein the spring locking means are also different. Thus, the water pail carries brackets generally indicated by numeral 75 in the same location as in the previously described pasteurizer. Each bracket 75 has wing portions 76 and 77, pail-supporting part 78 and downwardly extending lip 79. Each bracket also has part 80 extending below the pail-supporting portion. Parts 76, 77 and 80 of the bracket, bear on and are attached permanently to the inside surface of the water pail. Pail-supporting part 78 has upstanding parts 81 and 82 defining vertical walls. Support arms 44 carried by the milk pail in the modified form shown in Figures 8 to 10 inclusive, are generally the same as previously described. The width of the supporting arms is somewhat smaller than the distance between walls 81 and 82 so that the milk pail may be dropped vertically into position.

As shown in Figure 11, the spring cover lock comprises wire 85 having spring loops 86 and 87 formed therein beyond which the wire extends to form downwardly depending portions 88 and 89 with spring locking ends 90 and 91, respectively. Locking end 90 is preferably shorter than 91. As is clear in Figure 11, locking ends 90 and 91 extend in the same circular direction as seen from the center of the wire clip or spring. Flexible ball 93 of rubber or other similar material is slidably secured on wire 85.

It will be noted that wire 85 is bent so that the part of the wire overlying the aperture in cover 51 is bent downwardly and approaches the cover. The spring lock shown in Figure 11 is more flexible and more versatile than the lock shown in the previously described construction in connection with Figures 1 to 6 inclusive. In the modification shown in Figures 7 to 11 inclusive, when the milk pail is outside of the water pail, spring arms 90 and 91 will engage shoulders 46 of the milk pail arms to lock the cover in position. However, if the tolerances in the bracket shown in Figure 10 are close enough when the spring lock is on the milk pail, the milk pail will not go down into position in the water pail.

If desired, the bracket shown in Figure 10 may be enlarged so that the spring lock shown in Figure 11, when positioned over the milk pail, will permit the milk pail to slide down into the brackets. As shown, however, it is necessary that the milk pail be positioned within the water pail before the milk pail cover can be locked. This is done by positioning the milk pail and cover as shown in Figures 7 and 8 and then bending the spring lock down so that arms 90 and 91 will catch underneath the body of the brackets. The spring lock may then be turned, in this particular instance, counter-clockwise, as seen in Figure 9, so that wires 90 and 91 will slide under bracket part 78.

In both modifications, one of the spring arms, such as 90 in Figure 11 and 65 and 66 in Figure 6 is shorter than the corresponding other arm. This makes it easier to position the spring lock. Thus the spring lock may be disposed so that the longer finger of the spring comes under the desired part to be engaged, after which full attention may be devoted to the shorter spring finger. When both engage, the entire lock may be turned into locking position.

The pasteurizer may be heated by external means, as on a stove. Instead of a ball sealing member, a stopper with a thermometer passing through it and sealed thereto may be used. Milk temperature readings may then be readily taken during heating. It is understood that during pasteurization, outlet 22 will be closed. For cooling, top 26 is removed and cold water is directed into the water pail by means of a hose inserted into the space between the pails.

The pasteurizer pails, covers, brackets and the like, are preferably of metal. The gasket for the milk pail cover and the sealing ball are of suitable flexible material which will not harm the milk. These may be of certain rubbers or synthetic materials free of sulphur or other curing materials which tend to impart a disagreeable flavor to the milk. The gasket and sealing ball are readily handled for sterilizing.

The gasket may be easily removed from the cover by slapping the inside of the cover against the palm of the hand at the cover center. This jars the gasket loose. The cover gasket channel and the channel formed on the outside of the cover are rounded (in cross section) and may be cleaned very easily. The cover itself has such a high crown that any water collecting at the cover rim during pasteurization will simply roll along the channel rather than flow toward the cover center when the cover is tilted. During pasteurization, the water along the marginal trough will destroy pathogens in the gasket region.

To use the pasteurizer, milk is poured into the milk pail. The milk pail cover is positioned on the pail edge and the milk pail and cover are seated and locked in the water pail. The hot water outlet is closed. Then water is run into the water pail with a hose. After pasteurization is complete, cold water is run into the water pail through a hose. Preferably the cold water is run into the water pail near the bottom to displace the hot water. After cooling is completed, the milk pail with the cover still on is removed and then the milk pail cover may be removed.

It is not necessary to have both ends of the spring locking member engage the water pail support brackets. Thus in Figures 12 and 15 there is shown a modified locking member having one end 88' straight and adapted to pass through eyelet 49' in pail handle supporting part 48'. It will be noted that part 48' in this modified construction is higher than part 48 in the construction shown in Figure 4, for example. End 88' of the locking member may be threaded through eyelet 49' and thereafter the hooked end of the locking member may be sprung down and under the opposite support arm.

It is also possible to utilize the hot water overflow aperture as an anchor for an end of the spring locking member. Thus referring to Figures 13 and 14, hot water overflow 24' is engaged by end 88' of the spring locking member shown in Figures 13 to 15 inclusive. In all forms of pasteurizers, cover 26 is so designed that hot water overflow 24 or 24' may function. Thus the beaded edge of the water pail may be high enough above the hot water outlet so that a tight fitting water pail cover will be above the hot water outlet. Or the cover for the water pail may fit loosely, as shown, so water may flow through outlet 24 or 24' between the inside of the cover edge portion and opposing pail edge portion.

As illustrated in Figures 13 and 14, eyelet 49' for the milk pail allows the straight end 88' of the spring locking member to pass through the same. If desired, the eyelet construction shown in Figures 13 and 14 may be omitted, and the riveted construction shown in Figure 4 for example may be used. However, the eyelet construction is preferred. It will be noted that in the modifications shown in Figures 12 to 14 inclusive, the spring lock may function to lock the milk pail cover in place whether the milk pail is inside or outside of the water pail.

What is claimed is:

1. A pasteurizer for home use maintaining all parts accessible to the milk at wet heat during pasteurization, said pasteurizer comprising an outer water pail having a rim, hot and cold water outlets in the side wall of the pail, the cold water outlet being below the level of the hot water outlet, an inner milk pail having a rim, said inner pail being shallower than the outer pail, brackets carried by said outer pail at the inner surface, supporting arms carried by the inner pail on the outer surface thereof for cooperation with said brackets for supporting said milk pail in nesting relation inside of said water pail so that the inner pail clears the walls of the outer pail and the rim of the inner pail lies below the rim of the outer pail, a rigid crowned cover for said milk pail, the central part in said cover being apertured and being higher than the marginal cover portion during normal pasteurizer use and being lower than the outer pail rim, the highest point in said cover being between the cold and hot water outlets, said cover being formed to provide an annular marginal grooved portion disposed above the milk pail rim, an endless tubular air-filled gasket of flexible material lying in said grooved portion, a flexible sealing member for said cover aperture, spring wire means extending across the top of said milk pail cover for locking said cover upon said pail, the brackets carried by the outer pail having side portions for rotatably locking the supporting arms of said inner pail and the spring wire having the end portions thereof shaped to fit under the supporting arms when the inner pail is free of the outer pail and to fit under the brackets of said outer pail when the inner pail is disposed within said outer pail for locking the cover to said inner pail and also locking the inner pail within the outer pail.

2. The construction according to claim 1 wherein said wire carries a flexible ball as the sealing member for the cover aperture, said wire being bowed downwardly toward the cover to press said ball against the cover aperture.

3. A pasteurizer for handling small quantities of milk for home use and during pasteurizing maintaining all parts of the pasteurizer accessible to the milk at wet heat, said pasteurizer comprising an outer water pail having a rim, an inner milk pail having a rim, the inner pail being shallower and smaller than the outer pail and having outwardly extending portions at opposed points below the rim of the milk pail, means for supporting said inner pail within said outer pail so that during use the inner pail clears the walls of the outer pail with the plane of the rim of the inner pail lying below the plane of the rim of the outer pail, a rigid cover for said milk pail, said cover being shaped to provide an annular trough along the edge thereof, said trough being rounded and concave and extending upwardly from the body of the cover and the trough being adapted to fit over the milk pail rim when the cover is in place, the body of the cover rising from the portion adjacent the trough to the central portion, said central portion being apertured, an endless hermetically sealed tubular flexible gasket containing a gas, said gasket being adapted to fit snugly within the annular trough of the cover, a flexible sealing member for the apertured portion of the cover, said gasket and sealing member being substantially free of sulphur and having substantially no tendency to impair the taste or flavor of milk, and a wire member extending over the cover and provided with loop portions engaging said outwardly extending milk pail portions for locking the milk pail cover to the milk pail to provide a sealed container for the milk during pasteurization, said flexible sealing member being slidably mounted upon said wire member, the wire member retaining said sealing member tightly against the cover and the cover being forced tightly against the milk pail, said outer pail being adapted to hold water which surrounds the milk pail and covers at least part of the milk pail cover, the gasket providing a sealing action which improves with temperature rise because of expansion of gas therein, said gasket being readily removable from the cover trough for washing and said trough portion of the milk pail cover being readily accessible for cleaning.

References Cited in the file of this patent

UNITED STATES PATENTS

| | | |
|---|---|---|
| 100,863 | Corbett | Mar. 15, 1870 |
| 426,826 | Libbey | Apr. 29, 1890 |
| 430,132 | Libbey | June 17, 1890 |
| 713,154 | Richardson | Nov. 11, 1902 |
| 1,152,308 | Evans | Aug. 31, 1915 |
| 1,156,723 | Thomas | Oct. 12, 1915 |
| 1,332,019 | Allison | Feb. 24, 1920 |
| 1,479,750 | Smith | Jan. 1, 1924 |
| 1,688,815 | Kobash | Oct. 23, 1928 |
| 2,075,383 | Vaughn | Mar. 30, 1937 |
| 2,357,634 | Crites | Sept. 5, 1944 |
| 2,501,572 | Marquez | Mar. 21, 1950 |
| 2,513,577 | Malme | July 4, 1950 |

FOREIGN PATENTS

| | | |
|---|---|---|
| 205,007 | Great Britain | Oct. 11, 1923 |
| 559,560 | Germany | Sept. 22, 1932 |